March 7, 1967  J. T. CHRISTOFF  3,307,347
EXPANSIBLE BAND
Filed July 27, 1964  2 Sheets-Sheet 1
FIG. 1
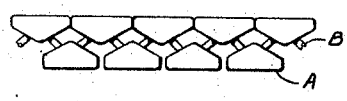
FIG. 2
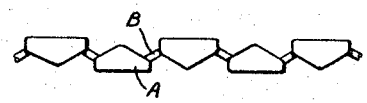
FIG. 3
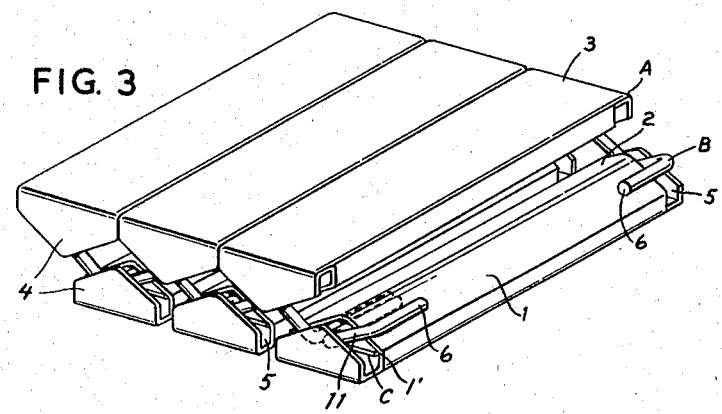
FIG. 4
FIG. 5
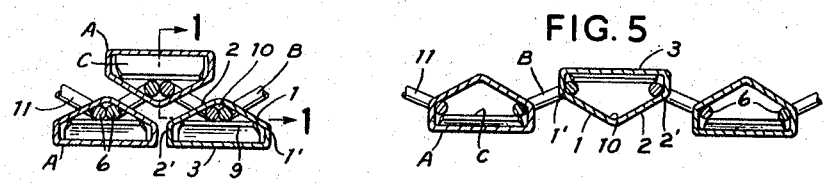
FIG. 6
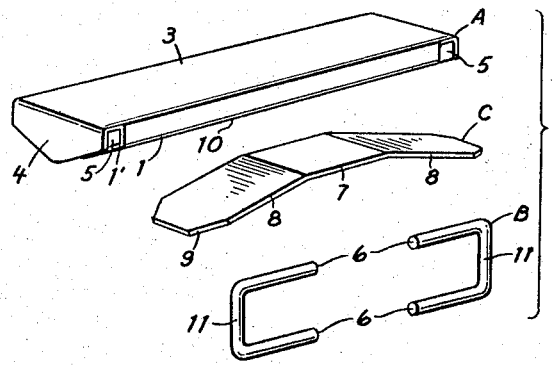
FIG. 7
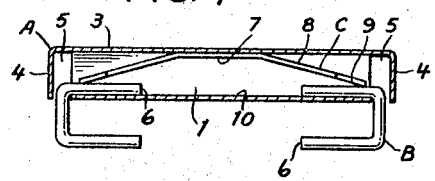
INVENTOR.
JAMES T. CHRISTOFF
BY
Dike, Thompson, Bronstein & Mrose
ATTORNEYS March 7, 1967  J. T. CHRISTOFF  3,307,347
EXPANSIBLE BAND
Filed July 27, 1964  2 Sheets-Sheet 2

INVENTOR.
JAMES T. CHRISTOFF
BY
Dike, Thompson, Bronstein & Mrose
ATTORNEYS

United States Patent Office 3,307,347
Patented Mar. 7, 1967

3,307,347
EXPANSIBLE BAND
James Thomas Christoff, Toronto, Ontario, Canada, assignor, by mesne assignments, to Textron Inc., Providence, R.I., a corporation of Rhode Island
Filed July 27, 1964, Ser. No. 385,442
Claims priority, application Canada, Feb. 8, 1964, 895,194
7 Claims. (Cl. 59—79)

The invention relates to an expansible band, for use for example in making an expansible wrist-watch band.

The essential object of this invention is to provide an expansible band, the elements of which are very simple in their function, and the parts of which are made of simple shape, and are easy to manufacture.

The bracelet consists of two rows of hollow links, which are arranged in a staggered manner in the longitudinal direction of the band, and of links connecting the same together so that the hollow links can be moved apart against spring action.

The invention consists in this that the hollow links of at least one row are of generally triangular cross-section, whereby the limbs of the connecting links are inserted into the hollow links, these limbs being pressed into the summit of the hollow links by a spring plate when the band is in the unexpanded state. If a pull is exerted, the limbs of the connecting links slide towards the bottom or the ceiling of the sleeves on generally oblique walls against the spring action, whereby the limbs press flat the spring plate and the hollow links move apart. When the band is stretched the hollow links of the one row move into the gaps between the hollow links of the other row.

Figure 8:
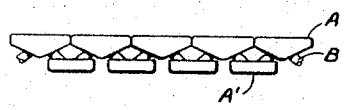
Figure 9:
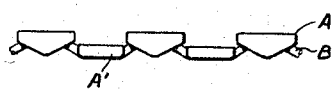
Figure 10:
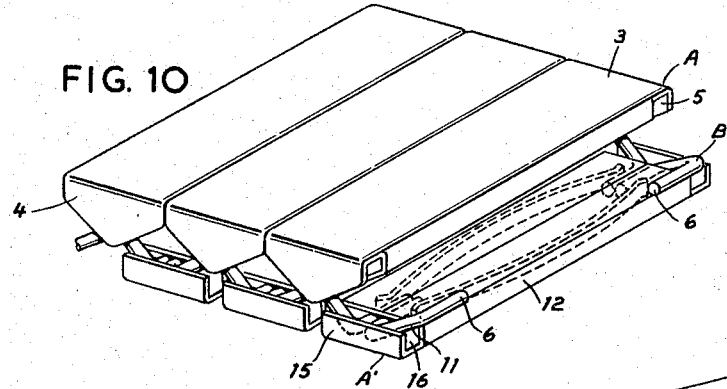
Figure 11:
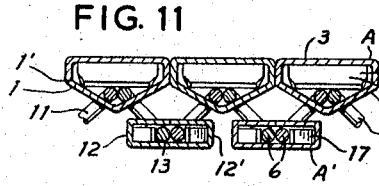
Figure 12:
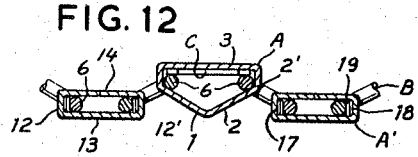
Figure 13:
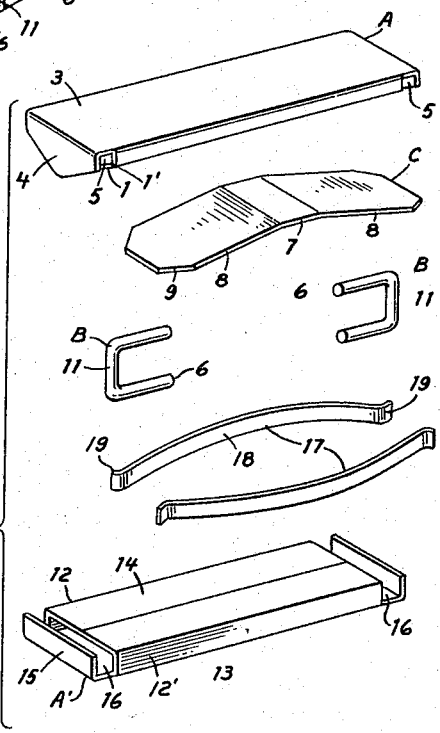
Figure 14:
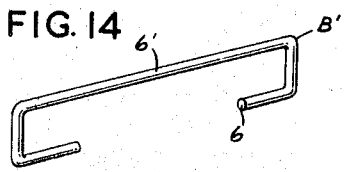

Two preferred embodiments of the invention are illustrated in the accompanying drawing in which:

FIGURE 1 is a side view of a part of a closed band;
FIGURE 2 is a side view of a part of an expanded band;
FIGURE 3 is a perspective view of a part of a closed band;
FIGURE 4 is a similar view of the band shown in FIGURE 1 is cross-section;
FIGURE 5 is a similar view of the band shown in FIGURE 2 in cross-section;
FIGURE 6 is a perspective view of all elements of the band;
FIGURE 7 is a cross-section of a hollow link along the line 1—1 of FIGURE 4;
FIGURE 8 is a view of a part of a closed band according to another embodiment of the invention;
FIGURE 9 is a view of a part of an expanded band;
FIGURE 10 is a perspective view of a part of a closed band;
FIGURE 11 is a similar view of the band shown in FIGURE 8, in cross-section;
FIGURE 12 is a similar view of the band shown in FIGURE 9, in cross-section;
FIGURE 13 is a perspective view of all parts of the second embodiment of the invention; and
FIGURE 14 is a perspective view of another connecting member.

Referring to FIGURES 1–7, the expansible band is composed of two rows of hollow links A, connecting members B and bent spring plates C.

The hollow links are formed of sleeves of generally triangular cross-section constituted by two generally oblique side walls 1, 2, and the main wall 3. The main wall 3 is longer than the said side walls 1, 2, whose free ends 4 are bent down. The hollow links A of the one row are staggered by a half width with respect to the hollow links A of the other row. Between the ends of the side walls 1, 2 and the downward bent ends 4 are provided slots 5 through each of which extends one pair of U-shaped connecting bows B which connect one hollow link of the one row with two adjacent hollow links of the other row. The connecting bows B consist of wire of circular cross-section whose limbs extend into the hollow links A.

A bent spring plate C is arranged within each hollow link A. The spring plate C has a central portion 7 and outwardly bent portions 8. The free ends 9 of the spring plates C press the limbs 6 into the summit of the hollow links A, whenever the band is closed, whereby the backs 11 of the connecting bows B stand oblique, and the limbs 8 of each adjacent connecting bow are moved together as shown in FIGURE 4. Whenever the bracelet is expanded the limbs 6 of the connecting bows B slide on the generally oblique walls 1, 2 against the main wall 3 and against the edges 1', 2' of the hollow links A and press flat the spring plates C as shown in FIGURES 2 and 5. In this case the hollow links A are pulled apart, and each hollow link A of the one row slides into the gap formed by two adjacent hollow links of the other row. When the expanding force is relieved the springs C will return the limbs 6 to the initial position and thus force together the hollow links A of the two rows.

The same effect may likewise be achieved by the embodiment of the invention shown in FIGURES 8–13. The outer row of hollow links A are formed of sleeves of generally triangular cross-section, with inserted connecting bows B and spring plates C as described above. The inner row of hollow links A' consists of sleeves of rectangular cross-section constituted by the side walls 12, 12', the bottom 13 and the ceiling 14. The bottom 13 is longer than the side walls 12, 12' and the ceiling 14 and its free ends 15 are bent upward, thus forming slots 16 between the upward bent ends 15 and the other walls. Through each slot 16 and 5 extends one pair of connecting bows B into the hollow links A, A'. Two bent leaf springs 17 are arranged within each hollow link A', their spring force working in a longitudinal direction of the bracelet. These springs have central bowed portions 18 which rest against the side walls 12, 12' and the outward bent end portions 19 pressing towards the middle of the hollow links A'. Between the end portions 19 of two leaf springs 17 rest the limbs 6 of the connecting bows B which are moved together when the bracelet is closed as shown in FIGURES 9 and 12.

When the band is expanded the limbs 6 of the connecting bows B slide on the generally oblique side walls 1, 2 of the hollow links A against the main wall 3 and the edges 1', 2', against the force of the springs C and 17, which press the limbs 6 back into the initial position when the expanding force is relieved.

FIGURE 14 discloses a further form B' of connecting bows which may be used in both described forms of the invention. It shows a connection 6' between two opposite U-shaped connecting bows of the form B.

The invention may also be embodied in other specific forms without departing from the spirit or essential characteristics thereof. The present embodiments are therefore to be considered in all respects as illustrative and not restrictive.

What I claim as my invention is:
1. An expansible linkage comprising two rows of links, the links of the first row being arranged in opposite and staggered relation to those of the second row, the links of at least the first row being of generally triangular cross-section, a leaf spring within at least each link of the first row, connecting bows whose limbs extend into the links, thus connecting each link of the first row with two adjacent links of the other row, the limbs of the connecting bows in at least the first row being moved together and towards the summits of the links in the first row by the springs, whereby when the linkage is expanded the limbs of the connecting bows in at least the first row slide on the diverging link walls towards the transverse walls of the generally triangular links and compress the springs and when the expanding force is relieved the springs move said limbs back to their initial positions.

2. An expansible linkage according to claim 1 wherein the limbs of the bows in at least the first row of links are generally circular in cross-section.

3. An expansible linkage according to claim 1 wherein the links of the second row are generally triangular in cross-section, there is a leaf spring within each link of the second row and the limbs of the connecting bows in both rows are moved together and towards the summits of the links by the springs, whereby, when the linkage is expanded, the limbs of the connecting bows in both rows of links slide on the diverging link walls towards the transverse walls of the links and compress the springs and, when the expanding force is relieved, the springs move the limbs back to their initial position.

4. An expansible linkage according to claim 3 wherein the limbs of the bows in both rows of links are generally circular in cross-section.

5. An expansible linkage according to claim 1 wherein the links of the second row of links are generally rectangular in cross-section.

6. An expansible linkage according to claim 5 also comprising two leaf springs within each link of the second row of links with their spring forces working in the longitudinal direction of the linkage, the springs in each link being located between the opposite side walls and the limbs of the bows whereby the limbs are moved towards each other by the springs when the linkage is contracted and the links compress the springs when the linkage is expanded.

7. An expansible linkage according to claim 6 wherein the limbs of the bows in both rows of links are generally circular in cross-section.

References Cited by the Examiner

FOREIGN PATENTS 635,639   3/1962   Italy.

CHARLES W. LANHAM, *Primary Examiner.*

G. P. CROSBY, *Assistant Examiner.*